United States Patent Office 3,213,172
Patented Oct. 19, 1965

3,213,172
CHILL-ROLL CASTING METHOD FOR PRODUCING FILM FROM THERMOPLASTIC POLYMERS
Russell L. Hoelzer, Fairview Park, Ohio, assignor to The Dow Chemical Company, Midland, Mich., a corporation of Delaware
No Drawing. Filed May 25, 1961, Ser. No. 112,498
4 Claims. (Cl. 264—216)

The present invention relates to a method of manufacturing film and more particularly to an improved method of producing free or unsupported film from thermoplastic polymers when using the chill-roll casting technique.

Rapid quenching of films from freshly extruded crystallizable thermoplastic polymers, in order to simultaneously solidify the film and to control to some degree the crystallinity of the film structure, is well known in the film processing art. The rapid quenching techniques usually employed for unsupported or free film are those of extruding a molten sheet of polymer into a cool liquid bath, most frequently water, or onto a cold metal surface such as a chill-roll. Heretofore, it has been the practice to maintain the surface of the chill-roll in a highly polished condition, approaching or simulating a mirror-like surface. The purpose of the high polish on the chill roll has been to assure uniform contacting of the film with the roll and thus provide uniform cooling of the film, and to develop a maximum amount of gloss on the film surface. This chill-roll method, however, suffers from one principal attendant disadvantage. Air bubbles or pockets become entrapped between the hot polymer melt and the polished chill-roll surface which causes erratic cooling and produces film of objectionable appearance and non-uniform physical properties. This inherent disadvantage is particularly evidenced when high film-casting rates are used. The cause for this is due apparently to the falling film acting as a pump pulling in air which is not dissipated from the point of contact of the molten film with the chill-roll, but instead is carried on between the two surfaces where it collects into bubbles and the like-creating imperfections. Also, certain amounts of air are inherently carried by the surfaces of the molten film and the chill-roll.

Another attendant difficulty when operating with a polished chill-roll is the extreme difficulty in achieving machine conditions which will eliminate the "laddering," or continuous rows of puckers that are usually evidenced in chill-roll cast film. Puckering is one of the prominent conditions that prevents a good lay-flat film so important to machineability of the film in further converting or fabrication.

It is the primary object of the instant invention to provide an improved method of melt extrusion casting of free films of thermoplastic polymers using a chill-roll wherein films of high gloss, high transparency and uniform physical properties are produced and high production rates may be utilized. Additional objects and advantages of the invention will be manifest in the ensuing description and specification.

These objects and advantages are realized in accordance with the invention whereby a thermoplastic film-forming resin is extruded as a molten film upon a chill-roll that has a satin or matte finished surface. The invention thus takes advantage of the finding that, contrary to the prior practice involving the necessity for employing a highly smooth-polished chill-roll to obtain desirable films, a specially roughened chill-roll provides equally beneficial results regards high gloss, high clarity and transparency, and provides more uniform physical properties and permits the use of faster, more commercially acceptable production rates. Among the better and more readily attained film physical properties resulting from the practice of the instant invention are included minimum occurrence of streaking, thin spotting, and bubble imperfections in the film, and a minimum puckering and thus better layflatness leading to better machineability of the film.

Although all the factors involved in the superior performance of the satin or matte finished roll are not fully understood, the principal contributing factor is believed to be that the entrapment of air between the film and the roll is eliminated by being permitted to escape at the roll edges or at the interface of the film and roll, or both, by way of the channels provided by the satin finish.

The satin surface of the chill-roll that is employed in carrying out the present invention is especially prepared by roughening the surface to some predetermined measurable degree. Generally, a method of sand-blasting, vapor-blasting, etching or grinding is employed to roughen the surface after which the surface may be chrome plated. As another alternative, a satin finish may be effected by a controlled plating of the surface, for example by satin chrome plating. A steel roll may advantageously be used. When it is desired to secure optimum heat transfer, however, other materials of construction may be utilized with great advantage for the roll including, for example, non-ferrous metals such as bronze and aluminum. Ordinarily, a sand-blasting or vapor-blasting technique is most beneficial. Care should be taken that the surface finish is not so rough that its contour is visibly reproduced in the film surface. Advantageously, the surface finish on the chill-roll should be maintained at a roughness between about 10 and 60 R.M.S. and more beneficially between about 20 and 40 R.M.S. Roughness, as related to a surface, is considered to be irregularities spaced less than 1/32 of an inch apart. When measuring roughness on a surface having a regular surface form, such as a plane, a cylinder or a cone, a qualitative description of the surface can be used using an average height dimension of the irregularities obtained from a profile curve made with a tracer instrument. The surface roughness can be thus measured in microinches (millionths of an inch) and is written "R.M.S." meaning the "root-mean-square" average height of surface irregularities or scratches as measured on a profile curve from a mean reference line which divided the irregularities so that the total area of peaks above this line equals the total area of the valleys below it.

Thus, when a chill-roll having the above-described surface characteristics is utilized in the manufacture of melt extrusion-cast films, the films have greatly improved physical properties and a highly efficient process results. If the chill-roll surface is too rough, the film surface will begin to take on the appearance of the roll to the point of becoming embossed. The film will also lose its gloss, clarity and uniformity and may tend to stick to the roll. On the other hand, a smoother roll than those profitably employed in the practice of the instant invention tend towards the mirror-like finish heretofore commonly employed with the herebefore described attendant drawbacks of bubble imperfections and slow web speeds.

In the practice of the invention, the chill-roll can be of any convenient width or diameter to suit the needs of the particular film forming operation. Similarly, the particular size and exact geometrical shape of the extrusion die is of no particular consequence and can be adapted according to the requirements of the extruded polymer and/or the finished film. The fall of the molten sheet of polymer from the extrusion die to the chill-roll surface and the exact angle of contact of the molten film will likewise be predominately dependent on the polymer extruded, the take-away or web speed, film gauge and so forth. For instance, the gap between the extruder die lips and the roll surface may be as low as one inch up to six or more inches.

The chill-roll temperature will depend, for the most part, on the polymeric resin being extruded, but additional allowances are usually made for the thermo efficiency of the chill-roll, the operating speed and the gauge of the film desired. It is of primary importance that the chill-roll temperature be maintained below the sticking temperature of the resin and below its fusion temperature. Thus, the temperature may range from 50° F. or less up to 165° F. or so on the surface of the roll. For example, for polyolefins and particularly polyethylene this temperature, frequently, is most advantageously maintained in the range from about 80 to 150° F.

The invention is applicable to extrusion casting of free films of any of the normally solid film-forming polymeric resins that are suitably melt extruded and cast into films on a chill-roll. Included in these are the polymers and copolymers of vinyl and vinylidene chloride; styrene; vinyl toluene; ethyl cellulose and other thermoplastic polymers such as a non-aromatic hydrocarbon polyolefin that is prepared by polymerization of a monoolefinic monomer that contains from 2 to about 8 carbon atoms in the monomer molecule, including the linear and branched varieties; polyamides including nylon-6 and nylon-66; polyesters such as polymethylmethacrylate, polyethylene terephthalate, and cellulose acetate butyrate.

Other auxiliary equipment may be used in connection with the matte or satin finished chill-roll of the invention that is frequently employed in this type of film-forming technique. Two or more of the satin finished chill-rolls may be employed in succession or a polished chill-roll may be used following the satin finished roll upon which the molten polymeric resin is cast. For instance, a stripping roll may be positioned to assist in taking the solidified film away from the chill-roll, and/or an airknife or auxiliary roll may be utilized to urge the molten film against the chill-roll.

By way of further illustration, a charge of polyethylene of 0.923 density and melt index 2.2 was cast into free film according to the present invention. A 48-inch wide, 30-inch diameter steel chill-roll having a surface roughness of about 30 R.M.S. was used to receive and solidify the molten polyethylene from a 60 inch wide extrusion die having a 0.02 inch die opening. The chill-roll surface was prepared by vapor blasting the steel chill-roll and then satin chrome plating the roll surface. The die was angled toward the chill roll at an approximate angle of 30° from the vertical such that the molten polyethylene film made contact with a surface of the chill-roll that was traveling in a generally downward direction. About a 1-inch gap was employed between the die face and chill-roll. The temperature of the melt was maintained at about 575° F. and the temperature of the chill-roll was about 165° F. A web speed of 230 feet per minute was readily maintained while producing film of about 1.5 mils having excellent clarity, gloss and uniformity with no apparent laddering or puckering in the film. The resulting film had excellent lay-flatness properties.

In contrast, when a smooth highly polished chill-roll is employed when making polyethylene film according to the above-described procedure, imperfections are noted in the film due to entrapment of air between the molten film and the chill-roll resulting in inferior and frequently unacceptable film. Also, continuous rows of puckers tend to develop in the film which seriously interfere with uniformity and subsequent processing of the film.

Similar excellent results were obtained when the satin finished chill-roll above was employed excepting to modify the procedure by using different web speeds and chill-roll temperatures as follows.

| Web speed (ft./min.): | Average chill-roll temperature, ° F. |
|---|---|
| 100 | 100 |
| 130 | 120 |
| 180 | 130 |
| 230 | 130 |

Results analogous to the foregoing are obtained when other polyolefins such as polypropylene or copolymers of ethylene and propylene are used, or when other of the normally solid film-forming polymeric resins are chill-roll cast into films in accordance with the invention as described in the foregoing.

Certain other modifications of the invention, not specifically delineated herein, can be entered into without departing from its intended spirit and scope and therefore it is to be understood that the invention is to be interpreted as defined in the hereto appended claims.

What is claimed is:

1. A method of forming a flat sheet of a normally solid film-forming polymeric resin which comprises extruding a molten sheet of said polymeric resin upon a continuously moving satin-finished surface characterized in having a roughness between about 10 and 60 R.M.S maintained at a temperature below the fusion temperature of said polymeric resin to solidify said molten sheet of said polymeric resin, and removing the solidified sheet from said surface; said surface upon which said molten sheet of said polymeric resin is extruded being characterized in having a satin finish.

2. The method of claim 1, wherein said surface upon which said molten sheet of said polymeric resin is extruded is characterized in having a roughness between about 20 and 40 R.M.S.

3. The method of claim 1, wherein said normally solid film-forming polymeric resin is a non-aromatic hydrocarbon polyolefin that is prepared by polymerization of a mono-olefinic aliphatic olefin monomer that contains from 2 to about 8 carbon atoms in the monomer molecule.

4. The method of claim 3, wherein said polyolefin is selected from the group consisting of polyethylene, polypropylene, and an ethylene-propylene copolymer.

References Cited by the Examiner

UNITED STATES PATENTS

| 2,114,072 | 4/38 | Cleveland. | |
| 2,317,447 | 4/43 | Domizi | 18—57 |
| 2,364,435 | 12/44 | Foster et al. | 18—57 |
| 2,799,896 | 7/57 | Grow et al. | |
| 2,976,567 | 3/61 | Jones et al. | 18—48 |
| 3,060,515 | 10/63 | Corbett | 18—56 |
| 3,121,915 | 2/64 | Heller | 264—216 |

ALEXANDER H. BRODMERKEL, *Primary Examiner.*

MICHAEL V. BRINDISI, MORRIS LIEBMAN,
*Examiners.*